United States Patent
Bassi et al.

(10) Patent No.: US 11,208,979 B2
(45) Date of Patent: *Dec. 28, 2021

(54) METHOD OF HYDRAULICALLY CONVERTING WIND POWER

(71) Applicant: King Abdulaziz University, Jeddah (SA)

(72) Inventors: Hussain Mohammad Bassi, Jeddah (SA); Muhammad Adnan Basha, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/030,557

(22) Filed: Sep. 24, 2020

(65) Prior Publication Data
US 2021/0010453 A1    Jan. 14, 2021

Related U.S. Application Data

(63) Continuation of application No. 16/164,316, filed on Oct. 18, 2018, now Pat. No. 10,823,135.

(51) Int. Cl.
| | |
|---|---|
| *F03B 13/06* | (2006.01) |
| *F03B 17/00* | (2006.01) |
| *F03G 3/00* | (2006.01) |
| *F03D 9/14* | (2016.01) |

(52) U.S. Cl.
CPC ............ *F03B 13/06* (2013.01); *F03B 17/005* (2013.01); *F03D 9/14* (2016.05); *F03G 3/094* (2021.08); *F05B 2260/422* (2020.08); *Y02E 60/16* (2013.01); *Y02E 70/30* (2013.01)

(58) Field of Classification Search
CPC ...... F03B 13/06; F03B 17/005; F03B 17/025; F03D 9/008; F03D 9/10; F03D 9/13;
(Continued)

(56) References Cited

U.S. PATENT DOCUMENTS

| | | | | |
|---|---|---|---|---|
| 459,280 A | * | 9/1891 | Garrett, Jr. | ............. F04B 17/00 |
| | | | | 417/329 |
| 4,838,025 A | | 6/1989 | Nells | |
| | | (Continued) | | |

FOREIGN PATENT DOCUMENTS

| | | | | |
|---|---|---|---|---|
| WO | WO-2011051956 A3 | * | 6/2011 | ............. F03B 17/04 |
| WO | WO 2011051956 A3 | | 6/2011 | |

OTHER PUBLICATIONS

Rosemary Ostfeld, "Newton Would be Proud: Gravity Power's Technology has Great Potential", Energy Storage, Green Patents, Apr. 9, 2012, pp. 1-2, http://www.greenpatentblog.com/2012/04/09/newton-would-be-proud-gravity-power%e2%80%99s-technology-has-great-potential/.

*Primary Examiner* — Mark A Laurenzi
*Assistant Examiner* — Xiaoting Hu
(74) *Attorney, Agent, or Firm* — Oblon, McClelland, Maier & Neustadt, L.L.P.

(57) ABSTRACT

Aspects of the disclosure provide a power conversion system and a method for conversing power. The power conversion system includes a first fluid holding tank, a second fluid holding tank, a fluid inlet hose, a fluid outlet hose, a fluid container, and one or more tension springs connected to the upper surface of the container and to a lower surface of the first fluid holding tank. The power conversion system further includes a rotational component connected to a lower side of the container via a connecting rod. The power conversion system further includes a generator connected to the rotational component via a horizontal shaft. The power conversion system further includes a feedback hose connected between the second fluid holding tank and the first fluid holding tank. The power conversion system further includes a hydraulic pump connected to the second fluid holding tank.

8 Claims, 4 Drawing Sheets

(58) Field of Classification Search
CPC ..... F03D 9/14; F03D 9/16; F03D 9/28; F03G 3/00; F03G 3/087; F03G 3/094; F03G 3/096; F03G 1/00; F03G 1/02; F03G 1/022; F03G 1/024; F03G 1/029; Y02E 60/16; Y02E 10/20; Y02E 70/30; F05B 2260/422; F05B 2260/502
See application file for complete search history.

(56) References Cited

U.S. PATENT DOCUMENTS

| | | | |
|---|---|---|---|
| 6,445,078 B1* | 9/2002 | Cieslak, Jr. | F03B 17/005 290/1 R |
| 7,777,359 B1* | 8/2010 | Gibson | F03G 3/00 290/54 |
| 8,143,740 B1* | 3/2012 | Simnacher | F03D 9/28 290/55 |
| 8,266,907 B2* | 9/2012 | Barrett | F03B 17/005 60/640 |
| 8,344,537 B2* | 1/2013 | Angulo Valpreda | F03B 17/04 290/54 |
| 9,121,383 B2 | 9/2015 | Nugent | |
| 2009/0193799 A1 | 8/2009 | LeBlanc | |
| 2011/0011086 A1 | 1/2011 | Megaro | |
| 2012/0090312 A1 | 4/2012 | Wilson | |
| 2013/0043684 A1* | 2/2013 | Shinohara | F03B 17/025 290/54 |
| 2015/0167627 A1* | 6/2015 | Villanueva, Jr. | F03B 17/005 290/1 C |
| 2017/0149306 A1 | 5/2017 | Gordon | |
| 2018/0149131 A1* | 5/2018 | Alkhars | F03B 17/005 |

\* cited by examiner

METHOD OF HYDRAULICALLY
CONVERTING WIND POWER

CROSS-REFERENCE TO RELATED APPLICATIONS

The present application is a Continuation of Ser. No. 16/164,316, pending, having a filing date of Oct. 18, 2018.

BACKGROUND OF THE DISCLOSURE

Field of the Disclosure

The present disclosure relates to a device and system for generating power with fluids.

Description of the Related Art

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Using gravity to generate power has long been used in the hydroelectric field. Gravity, a powerful natural phenomenon, can be converted into useful mechanical power in many ways. Gravity can also be used with renewable energy, such as wind power and solar power, to generate electricity more efficiently.

SUMMARY OF THE DISCLOSURE

In an embodiment of the present disclosure, there is provided a power conversion system. The power conversion system includes a first fluid holding tank, a second fluid holding tank, a fluid inlet hose, a fluid outlet hose, and a fluid container. The fluid container includes an inlet opening on an upper surface of the container. The inlet opening is connected to the first fluid holding tank via the fluid inlet hose. The fluid container further includes an outlet opening on a lower surface of the container. The outlet opening is connected to the second fluid holding tank via the fluid outlet hose. The power conversion system includes one or more tension springs connected to the upper surface of the container and to a lower surface of the first fluid holding tank. The power conversion system includes a rotational component connected to a lower side of the container via a connecting rod. The rotational component is configured to rotate upon lowering and rising of the fluid container. The power conversion system includes a generator connected to the rotational component via a horizontal shaft. The generator receives a power input from the rotational component, via the horizontal shaft. The power conversion system further includes a feedback hose connected between the second fluid holding tank and the first fluid holding tank; and the power conversion system includes a hydraulic pump connected to the second fluid holding tank. The hydraulic pump is configured to pump a fluid from the second fluid holding tank to the first fluid holding tank, via the feedback hose.

In an embodiment of the present disclosure, there is provided a power conversion method. The method includes filling a fluid from a first fluid holding tank into a fluid container, via a fluid inlet hose. The method includes lowering a connecting rod. A first end of the connecting rod is connected to a lower surface of the fluid container. The lowering of the connecting rod is in response to a lowering of the fluid container caused by an increased weight of the fluid entering into the fluid container. The method includes rotating a rotational component downward. The rotational component is connected to a second end of the connecting rod. The method includes emptying the fluid from the fluid container into a second fluid holding tank, via a fluid outlet hose. The method includes raising the connecting rod in response to a rising of the fluid container caused by a decreased weight of the fluid leaving the fluid container. The method includes rotating the rotational component upward. The method includes feeding the fluid from the second fluid holding tank to the first fluid holding tank via a feedback hose and a hydraulic pump. The method further includes generating power into a generator. The generator is connected to the rotating rotational component via a rotating horizontal shaft.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Detailed descriptions of the embodiment are provided herein. It is to be understood, however, that the present disclosure may be embodied in various forms, compounded or stacked in unison. Structural framework and fastening such as nuts and bolts are purposely omitted to provide a better general concept of the present disclosure. It is to be understood that lubrication and/or bearings are to be used in high friction areas. Therefore, specific details disclosed herein are not to be interpreted as limiting, but rather as a basis for the claims and as a representative basis for teaching one skilled in the art to employ the present disclosure in virtually any appropriately detailed system, structure or manner.

Figure 1:
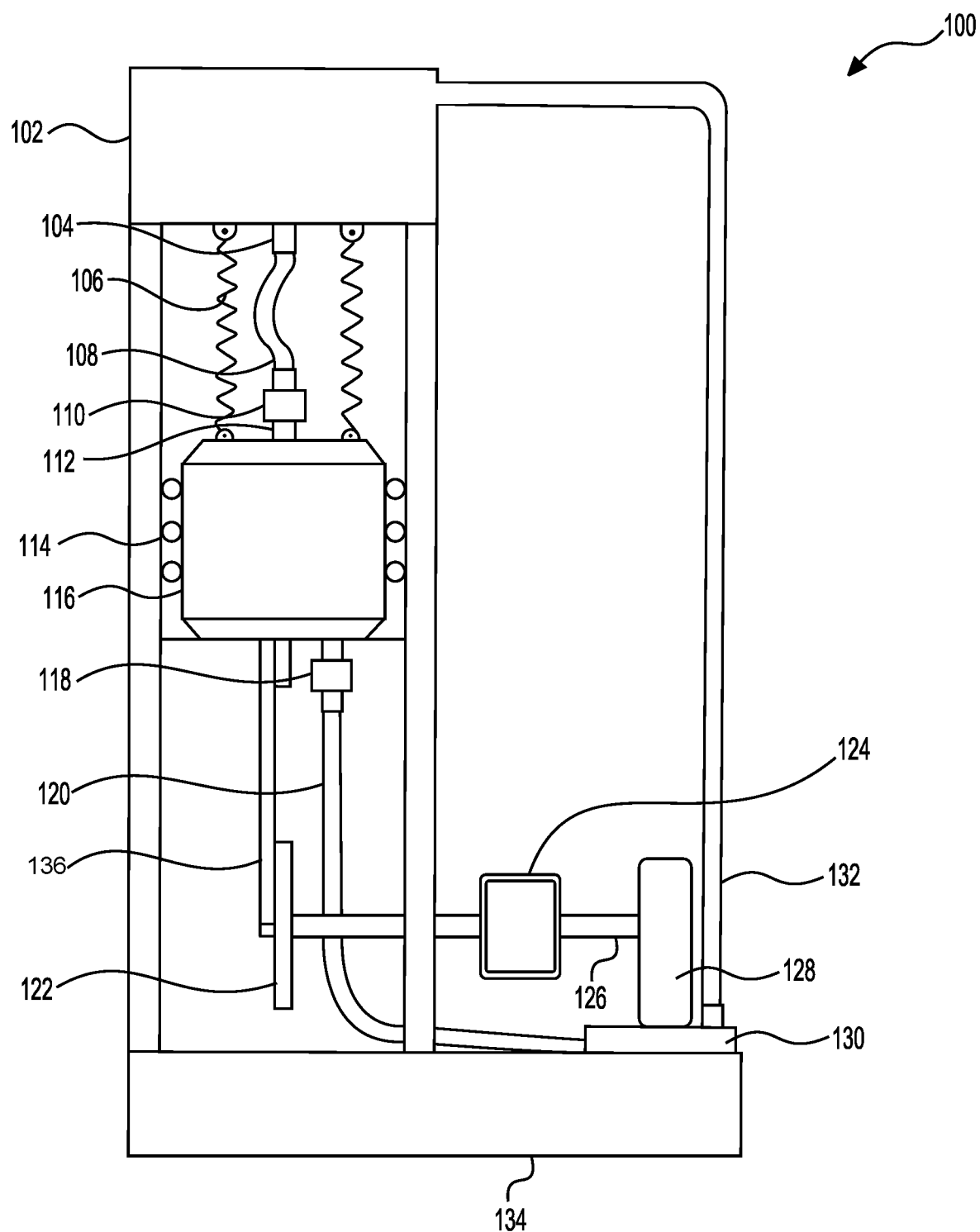
FIG. 1 shows a front view of a power conversion system 100 according to an embodiment of the present disclosure.

FIG. 1 shows a block diagram of a power conversion system 100 according to an embodiment of the present disclosure. The power conversion system 100 includes a first fluid holding tank 102 and a second fluid holding tank 134 which hold a working fluid such as water at different heights, a fluid container 116 connected to the first fluid holding tank 102 through a first tube 108 and connected to the second fluid holding tank 134 through a second tube 120. The fluid container 116 is attached to rollers 114, so the fluid container 116 could easily move up and down in its track depending on the tensions of springs 106. The details of the tension springs 106 will be described later.

The power conversion system 100 further includes a rotational component 122. The rotational component 122 is connected to a lower side of the fluid container 116 via a connecting rod 136 and a power generator 128 connected to the rotational component 122 via a horizontal shaft 126. The rotational component 122 may be a turning wheel, a disk, or any other linear-to-rotational conversion machines. The power generator 128 may be a device that converts motive power (mechanical energy) into electrical power for use in an external circuit. Sources of mechanical energy may include steam turbines, gas turbines, water turbines, internal combustion engines. In an embodiment of the present disclosure, the mechanical energy comes from the vertical motion of the fluid container 116. Mechanically a power generator consists of a rotating part such as a rotor and a stationary part such as a stator.

FIG. 1 also illustrates that tension springs 106 are connected to the upper surface of the fluid container 116. A fluid feedback tube 132 is connected between the second fluid holding tank 134 and the first fluid holding tank 102 and transmits fluid from the second fluid holding tank 134 to the first fluid holding bank 102 by using a hydraulic pump 130.

FIG. 1 also shows a gearbox 124 which is connected to the horizontal shaft 126 and is able to adjust a speed of rotation of the horizontal shaft. Specifically, the gearbox 124 may amplify and adjust a rotational motion of the horizontal shaft 126 before feeding as a load to the power generator 128. The power generator 128 may power up the hydraulic pump 130 which is connected to the second fluid holding tank 134. The hydraulic pump 130 pumps a fluid, such as water, from the second fluid holding tank 134 to the first fluid holding tank 102, via the feedback tube 132.

FIG. 1 shows that the vertical motion of the fluid container 116 may be converted to rotational motion by the rotational component 122 which is further converted to electricity by the power generator 128. The power generator 128, together with other types of energy, may provide power to the hydraulic pump 130 to pump the fluid from the second fluid holding tank 134 to the first fluid holding tank 102. Therefore, the fluid stored in the first fluid holding tank 102 and the second fluid holding tank 134 can be reused and the vertical motion of the fluid container 116 may be continuously performed without any breaks.

In an embodiment of the present disclosure, the hydraulic pump 130 may be mechanically, hydraulically or electromechanically connected to a wind power generation system and draws power from the wind power generation system and/or may utilize the wind power system to aid in the lifting of water from the second fluid holding tank 134 to the first fluid holding tank 102. The wind power generation system may include a wind turbine which converts the wind's kinetic energy into electrical energy and/or a windmill that mechanically lifts water or a hydraulic fluid. The wind turbine includes blades (wind turbine blades) which are attached to a rotor, and generates power by the rotor being rotated by utilizing wind power energy which is renewable energy. The windmill may include a lifting system that includes a motor and reciprocating lifting system.

In the wind turbine, the rotor is supported at one side end portion of a nacelle, and rotates in a rotation direction R around a horizontal-direction rotation axis. The rotor may include a hub and a plurality of blades. In the rotor, the hub includes a tip cover in a semi-ellipsoidal shape and is formed so that an outside diameter of its outer peripheral surface increases as it goes from a windward side toward a leeward side. In the rotor, the plural blades are attached around the hub so as to be apart from one another in the rotation direction R. For example, three pieces of the blades are provided, and each of them has one end rotatably supported by the hub for the purpose of adjusting a pitch angle α.

Therefore, because the wind power system provides supplemental power to the hydraulic pump, the hydraulic pump 130 is able to not only utilize power from the power generator 128, but also from the wind turbine and/or windmill. Therefore, the efficiency of the power generation system is improved.

In an embodiment of the present disclosure, the power generator 128 may include a solar panel. A solar panel absorbs sunlight as a source of energy to generate electricity. For example, a photovoltaic (PV) module is a packaged assembly of typically 6×10 photovoltaic solar cells. Photovoltaic modules constitute the photovoltaic array of a photovoltaic system that generates and supplies solar electricity for the power generator 128 to power up the hydraulic pump 130.

Generally, solar radiation impinging on the surface of, and entering into, the substrate of a solar cell creates electron and hole pairs in the bulk of the substrate. The electron and hole pairs migrate to p-doped and n-doped regions in the substrate, thereby creating a voltage differential between the doped regions. The doped regions are connected to the conductive regions on the solar cell to direct an electrical current from the cell to an external circuit. When PV cells are combined in an array such as a PV module, the electrical energy collected from all of the PV cells can be combined in series and parallel arrangements to provide power with a certain voltage and current.

Therefore, the hydraulic pump 130 is able to not only utilize electrical and/or mechanically power from the power generator 128, but also electrical energy from the solar panel. Therefore, the efficiency of the power conversion system is improved.

The fluid container 116 includes an inlet opening 112 on an upper surface of the container which is connected to a first solenoid valve 110 and an outlet opening on a lower surface of the container which is connected to a second solenoid valve 118. The first tube 108 is connected to a fluid tank outlet opening 104 and the first solenoid valve 110.

The first and second solenoid valves 110 and 118 may be electromechanically operated valves. The valves are controlled by an electric current through a solenoid and may be used with an automatic controller. The valves could be a two-port valve or a three-port valve. In the case of a two-port valve, the fluid flowing from the first fluid holding tank 102 is switched on or off; in the case of a three-port valve, the outflow is switched between the two outlet ports. Multiple solenoid valves can be placed together on a manifold. An indicator is attached to the first solenoid valve and the second solenoid valve. The indicator could be a limit sensor and photoelectric sensor that controls the solenoid valve. The first and second solenoid valves' power may be supplied by solar energy or a battery, which will be described later.

In an embodiment of the present disclosure, the first fluid holding tank 102 may include solar panels on the top of the first fluid holding tank. The solar panels may be connected to the solenoid valves 110 and 118 or the hydraulic pump 130 to provide electricity. As described before, the solar panels convert radiant energy (e.g., light) into electrical energy. Generally, solar cells are packaged in a solar device, and the solar device includes the solar cells and peripheral circuitry, such as bypass diode, current sensor, control circuitry, and the like that are suitably connected with the solar cells. Therefore, in the daytime, the solar panels absorb sunlight and convert the radiant energy into electrical energy to control the solenoid valves 110 and 118 or the hydraulic pump 130. As such, the efficiency of the power conversion system is improved.

In an embodiment of the present disclosure, the whole body of the power conversion system, including the first fluid holding tank 102 and the second fluid holding tank 134, may include solar panels to maximize the use of the solar energy. Specifically, the solar panels may be installed on the surfaces of the first fluid holding tank 102 and the second fluid holding tank 134. The solar panels may be electrically connected to the power generator to aid in the lifting of the fluids from the second fluid holding tank 134 to the first fluid holding tank 102. As such, the efficiency of the power conversion system is further improved.

Figure 2:
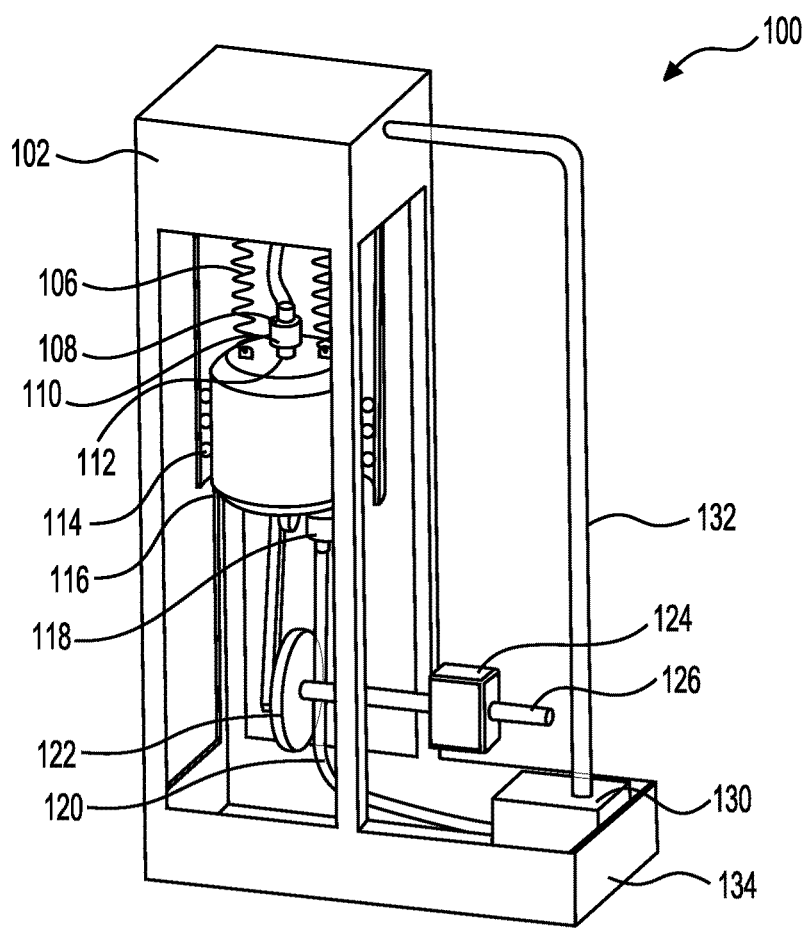
FIG. 2 shows a different view of the power conversion system 100.

FIG. 2 shows an isometric view of the power conversion system 100. A power generator is not shown in FIG. 2.

Figure 3:
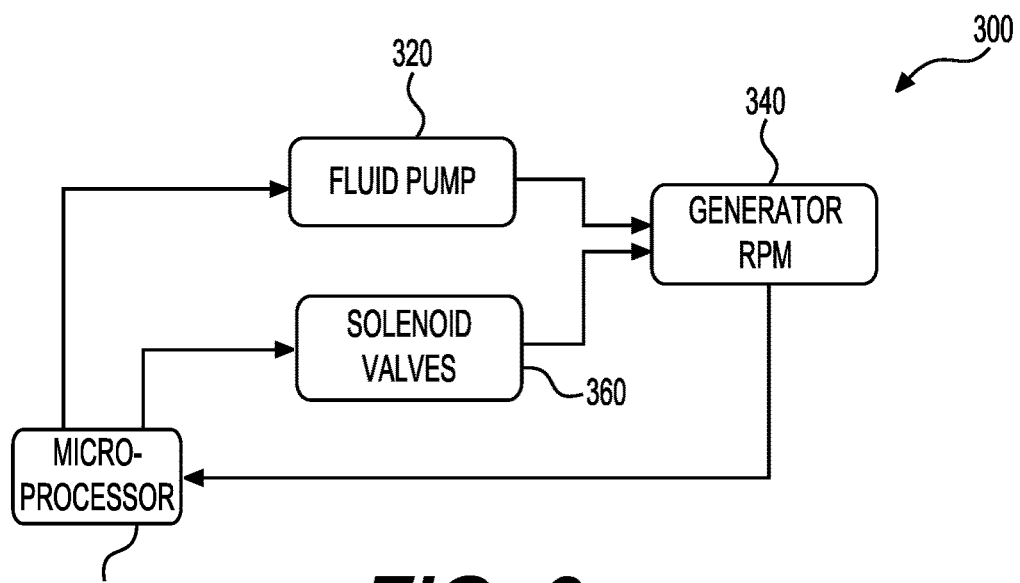
FIG. 3 shows a control black diagram according to an embodiment of the present disclosure.

FIG. 3 shows a control block diagram according to an embodiment of the present disclosure. For example, the power generator 340 includes a microprocessor 380 which controls a fluid pump 320 and solenoid valves 360. The microprocessor 380 incorporates a computer's central processing unit (CPU) on a single or a few integrated circuits. It may be a programmable multipurpose silicon chip, clock driven, register based, accepts binary data as input and provides output after processing it as per the instructions stored in a memory. Some or all of these functions may be realized by an application specific integrated circuit (ASIC), a field programmable gate array (FPGA), a digital signal processor (DSP), or the like.

A fluid pump is a mechanical source of power that converts mechanical power into hydraulic energy (hydrostatic energy i.e. flow, pressure). It generates flow with enough power to overcome pressure induced by the load at the pump outlet. When a hydraulic pump operates, it creates a vacuum at the pump inlet, which forces liquid from the reservoir into the inlet line to the pump and by mechanical action delivers this liquid to the pump outlet and forces it into the hydraulic system. The fluid pump may include a battery to be used at the start-up stage. A rotary vane pump may be used. A rotary vane pump has higher efficiencies than a gear pump, but is also used for mid pressures up to 180 bar (18,000 kPa) in general. Modern units can exceed 300 bar (30,000 kPa) in continuous operation, although vane pumps are not regarded as "high pressure" components. Some types of vane pumps can change the center of the vane body, so that a simple adjustable pump is obtained. These adjustable vane pumps are in general constant pressure or constant power pumps: the displacement is increased until the required pressure or power is reached and subsequently the displacement or swept volume is decreased until an equilibrium is reached. The fluid pump 320 may be realized by the fluid pump 130, as shown in FIG. 1. The fluid pump 320 pumps a fluid released from the fluid container 116 to the first fluid holding tank via the feedback tube 132.

The generator 340 will be wound so that at the designed RPM, so it will output a desired voltage. Generally, the voltage is fixed such as 240 or 120 VAC, so it is always the intention to run the generator at the specified RPM to make the line frequency correct. Given the correct fixed voltage, the power is limited to the current capacity times the voltage. The generator 340 may be realized by the power generator 128, as shown in FIG. 1, which is coupled to the horizontal shaft 126 sand is rotated at rated speed. For example, the power generator 128 rotates at 1750 rpm for 4 poles machines at 60 Hz.

Figure 4:
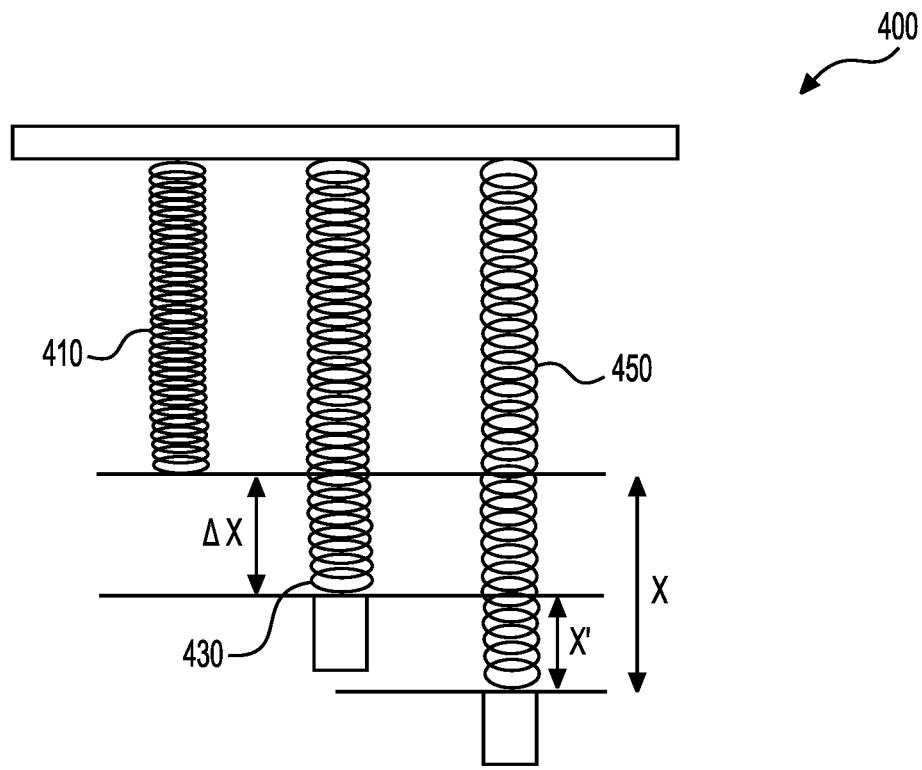
FIG. 4 shows a retracting mechanism with different displacements according to an embodiment of the present disclosure.

FIG. 4 describes a retracting mechanism 400 with different displacements according to an embodiment of the present disclosure. The retracting mechanism 400 includes a tension spring 410 which is connected between the upper surface of the fluid container 116 and a lower surface of the first fluid holding tank 102. The tension spring 410 may be the tension springs 106 in FIG. 1.

Tension springs, also called extension springs, absorb and store energy as well as create a resistance to a pulling force. For example, when the fluid container 116 is filled with fluid, such as water, the gravity of the container is larger than the resistance created by the tension springs and makes the container move downward to push the linage in the mechanical converter. FIG. 4 shows that a tension spring 430 extends ΔX when the fluid container gains weight and a tension spring 450 further extends X' when the fluid container further moves downward. Therefore, the tension spring 450 extends a total distance of X=X'+ΔX when the fluid container is filled with fluid. Therefore, the spring 106 controls the movement of the fluid container 116 together with the gravity of the fluid container 116.

Figure 5:
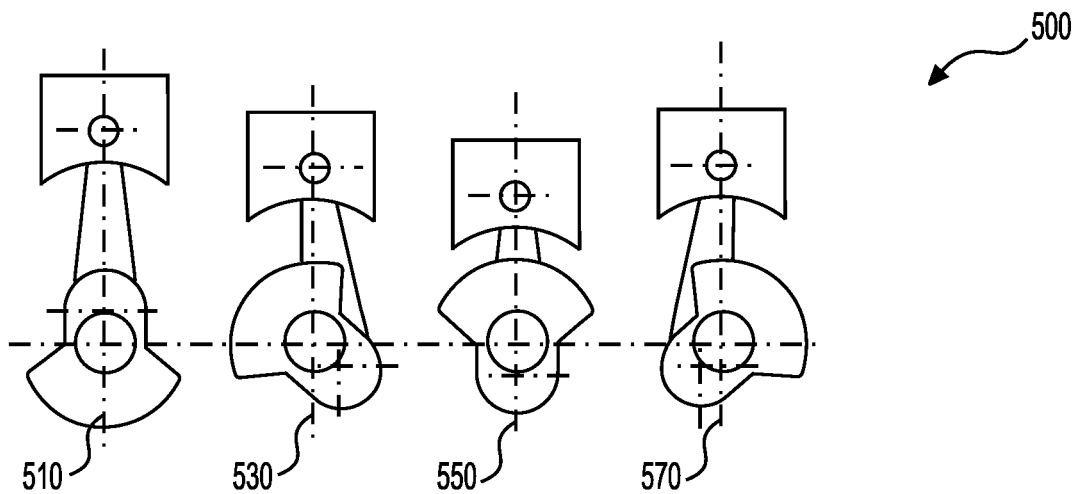
FIG. 5 shows a rotational component with four positions according to an embodiment of the disclosure.

FIG. 5 describes a mechanical converter 500 including a rotational component with four positions according to an embodiment of the present disclosure. The mechanical converter 500 converts the linear motion of the fluid container 116 into rotary motion as an input to the power generator 128 in order to generate electricity. The power converted by the mechanical converter 500 transmits through the connecting rod 136 and the horizontal shaft 126 to the power generator 128. The mechanical converter 500 includes a rotational component 510 which is at an original position and a connecting rod 136. The connecting rod moves around an axis in response to the movement of the fluid container 116 and the movement of the connecting rod causes the rotational component 510 to rotate. FIG. 5 also shows that the rotational component 530 moves about one third of a circle from its original position when the connecting rod moves for a certain distance, in response to the moving of the fluid container. The fluid container gains more weight and moves it downward to push the linkage in the mechanical converter and causes the disk/rotational component to rotate. The rotational component is connected to a gearbox via the horizontal shaft and the gearbox increases the rotation speed of the shaft. This rotatory motion is then transmitted to the gearbox 124 and the power generator 128 through the horizontal shaft 126. Similarly, FIG. 5 also describes that the rotational component 550 moves about half a circle from its original position when the connecting rod moves to a different position. Further, in response to the fluid container moving up by the tension springs, the connecting rod and the rotational component 470 move accordingly.

Figure 6:
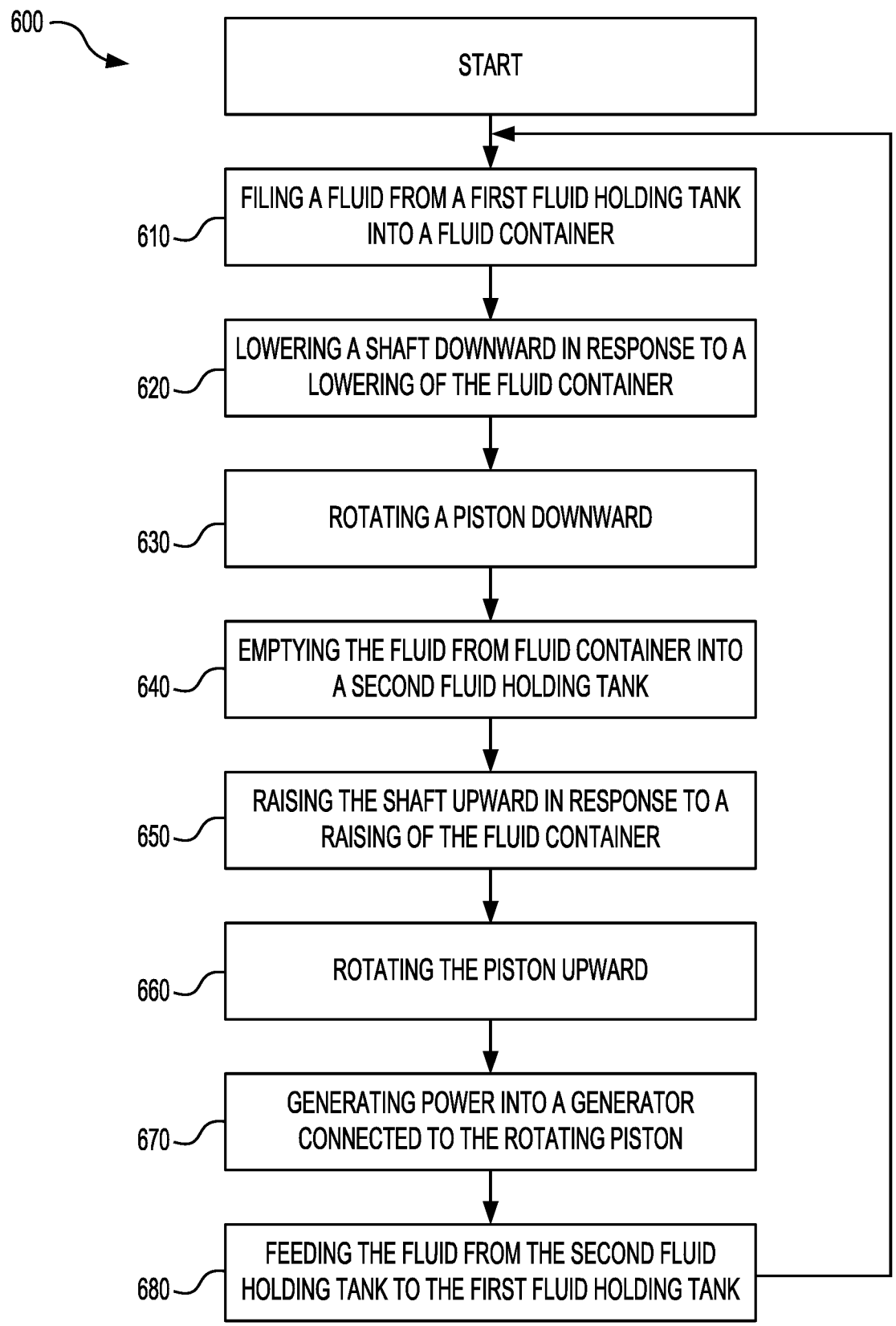
FIG. 6 shows a flowchart of a power conversion method according to an embodiment of the present disclosure.

FIG. 6 describes a flowchart of a power conversion method according to an embodiment of the present disclosure.

In step 610, a fluid is filled from a first fluid holding tank into a fluid container, via a fluid inlet hose.

For example, the fluid may be water and the fluid inlet hose may be controlled by a solenoid valve connected to the upper side of the fluid container. The fluid inlet is open when the fluid is filled from the first fluid holding tank into the fluid container 116 when the fluid container is at its upper position.

In step 620, a connecting rod is lowered in response to a lowering of the fluid container.

When the fluid container contains more water, it starts to moving downward based on a comparison of the gravity of the fluid container, including the fluid inside, and the spring tension.

In step 630, a rotational component is rotated upon lowering of the fluid container. The rotational component is connected to a lower side of the container via a connecting rod and a horizontal shaft.

In step 640, the fluid in the fluid container is emptied into a second fluid holding tank.

When the fluid container reaches a bottom of the system, a fluid outlet hose, which may be controlled by a second solenoid valve and connected to the lower side of the fluid container, is open and the fluid inlet hose becomes closed. The fluid starts to flow into a second fluid holding tank. Therefore, the fluid container may become empty.

In step 650, the connecting rod is raised upward in response to a rising of the fluid container. When the fluid in the fluid container is discharged into the second fluid holding tank and the water level in the fluid container reaches a threshold and the fluid is pumped into the first fluid holding tank, the tension spring starts to raise the fluid container. The connecting rod, therefore, is raised in response to a rising of the fluid container.

In step 660, when the connecting rod is moving upward, the rotational component connected to the connecting rod is rotated.

In step 670, power is generated into a generator connected to the rotating rotational component via a rotating horizontal shaft. The power generator may be an electric dynamo. The electric dynamo uses rotating coils of wire and magnetic fields to convert mechanical rotation into a pulsing direct electric current through Faraday's law of induction. A dynamo machine consists of a stationary structure, a stator, which provides a constant magnetic field, and a set of rotating windings which turn within that field.

In step 680, the fluid is fed from the second fluid holding tank to the first holding tank, which causes the fluid container to gain weight and start moving downward.

The flow of the fluid back into the first holding tank from the second holding tank may be closed loop recycling.

Numerous modifications and variations of the present disclosure are possible in light of the above teachings. It is therefore to be understood that within the scope of the appended claims, the present disclosure may be practiced otherwise than as specifically described herein.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of converting wind power, the method comprising:
    filling a fluid from a first fluid holding tank into a fluid container, via a fluid inlet hose;
    lowering a connecting rod, a first end of the connecting rod connected to a lower surface of the fluid container, the lowering of the connecting rod being in response to a lowering of the fluid container caused by an increased weight of the fluid entering into the fluid container;
    rotating a rotational component downward, the rotational component connected to a second end of the connecting rod;
    emptying the fluid from the fluid container into a second fluid holding tank, via a fluid outlet hose;
    raising the connecting rod in response to a rising of the fluid container caused by a decreased weight of the fluid leaving the fluid container;
    rotating the rotational component upward;
    feeding the fluid from the second fluid holding tank to the first fluid holding tank via a feedback hose and a hydraulic pump connected to a wind power generation system configured to provide at least a portion of the power to feed the fluid from the second fluid holding tank to the first fluid holding tank; and
    generating power into a generator, the generator being connected to the rotating rotational component via a rotating horizontal shaft,
    wherein a first and a second tension spring are directly connected to an upper surface of the fluid container and directly connected to a lower surface of the first fluid holding tank; and
    wherein the first fluid holding tank is integral with a frame, the frame having an outer perimeter spatially within which the first and second tension springs and the fluid container are contained.

2. The method of claim 1, wherein the rotating horizontal shaft is connected to a gearbox configured to adjust a speed of rotation of the rotating horizontal shaft.

3. The method of claim 1, further comprising:
    regulating, by an upper solenoid valve connected to the fluid inlet hose, a first flow of the fluid from the first fluid holding tank to the fluid container; and
    regulating, by a lower solenoid valve connected to the fluid outlet hose, a second flow of the fluid from the fluid container to the second fluid holding tank.

4. The method of claim 1, wherein the fluid container is attached to a plurality of rollers configured to provide vertical movement of the fluid container against an immovable surface.

5. The method of claim 1, wherein the wind power generation system comprises a wind turbine.

6. The method of claim 5, wherein the wind turbine converts wind kinetic energy into electrical energy to hydraulically feed the fluid from the second fluid holding tank to the first fluid holding tank.

7. The method of claim 1, wherein the wind power generation system comprises a windmill.

8. The method of claim 7, wherein the windmill mechanically feeds the fluid from the second fluid holding tank to the first fluid holding tank.

* * * * *